US012308867B2

(12) United States Patent
Gao et al.

(10) Patent No.: US 12,308,867 B2
(45) Date of Patent: May 20, 2025

(54) SIGNAL FEEDBACK GAIN CIRCUIT

(71) Applicant: LeRain Technology Co., Ltd., New Taipei (TW)

(72) Inventors: Miaobin Gao, New Taipei (TW); Chia-Chi Hu, New Taipei (TW)

(73) Assignee: LERAIN TECHNOLOGY CO., LTD., New Taipei (TW)

( * ) Notice: Subject to any disclaimer, the term of this patent is extended or adjusted under 35 U.S.C. 154(b) by 510 days.

(21) Appl. No.: 17/717,577

(22) Filed: Apr. 11, 2022

(65) Prior Publication Data

US 2023/0170924 A1 Jun. 1, 2023

(30) Foreign Application Priority Data

Dec. 1, 2021 (TW) ................................ 110144842

(51) Int. Cl.
*H04B 1/04* (2006.01)

(52) U.S. Cl.
CPC ....... *H04B 1/04* (2013.01); *H04B 2001/0416* (2013.01)

(58) Field of Classification Search
CPC .... H04B 1/02; H04B 1/04; H04B 2001/0408; H04B 2001/0416; H04B 2001/0433; H04B 2001/045; H04B 2001/0458; H04B 1/0475; H04B 1/0483; Y02D 30/50; Y02D 30/70
See application file for complete search history.

(56) References Cited

U.S. PATENT DOCUMENTS 5,923,164 A * 7/1999 Ehling .................. H03G 3/001
324/207.13
8,565,671 B2 10/2013 Robert et al.
9,692,589 B2 * 6/2017 Iyer ......................... H04L 1/241
11,533,205 B2 * 12/2022 Vining .............. H04L 25/03828
11,736,074 B2 * 8/2023 Zeng ...................... H03F 3/193
330/291

FOREIGN PATENT DOCUMENTS

CN 2746651 Y * 12/2005 .............. H03F 1/34
CN 101755396 A 6/2010

OTHER PUBLICATIONS

Wu, "A Direct-feedback Linear Power Amplifier", CN-2746651-Y, Dec. 14, 2005, English Text (Year: 2005).*

* cited by examiner

*Primary Examiner* — Quochien B Vuong
(74) *Attorney, Agent, or Firm* — Muncy, Geissler, Olds & Lowe, P.C.

(57) ABSTRACT

A signal feedback gain circuit is disclosed. The signal feedback gain circuit includes a signal input terminal, a summing point, a gain module, a signal output terminal and a plurality of feedback paths. The signal input terminal is for inputting a transmission signal. The summing point is connected to the signal input terminal. The gain module is connected to the summing point to input and adjust the gain of the transmission signal. The signal output terminal is for receiving the transmission signal and outputting it to an electronic module. The plurality of feedback paths are connected in parallel to the signal output terminals so as to input the transmission signal and are further connected in parallel to the summing point so as to feedback the transmission signal to the summing point. Accordingly, the plurality of feedback paths can adjust a gain curve of the transmission signal.

6 Claims, 4 Drawing Sheets

SIGNAL FEEDBACK GAIN CIRCUIT

BACKGROUND OF THE INVENTION

Field of the Invention

The present invention relates to a signal feedback gain circuit, and more particularly to a signal feedback gain circuit capable of flexibly adjusting a gain curve of a transmission signal.

Description of the Prior Art

Transmission rates of data communications continue to increase with the advancement of technology. High speed data transmission is a requirement of communication apparatuses or server apparatuses, and the transmission speed can reach 32 Gb/s with the current PCIe Gen5 or even 64 Gb/s with PCIe Gen6. However, in such high-speed transmission environments, signal strength loss caused by paths is critical. In the prior art, a gain module is usually used for signal compensation.

Please refer to FIG. 1, which shows a schematic diagram of a signal energy intensity curve of the prior art.

As shown in FIG. 1, in an ideal curve 91, the energy intensity of a signal gradually decreases as the frequency increases. However, in practice, an actual curve 92 does not exhibit a directly proportional linear relationship. In the prior art, an amplifier or a signal re-driver is used to obtain a gain curve 93 for compensating an energy of a signal such that an actual energy curve of a signal approaches the ideal curve 91. However, with the evolution of signal transmission channels, the relationship between the energy and frequency of a signal are much more complex, and a conventional gain module of the prior art cannot compensate an actual energy attenuation curve to perfection.

Therefore, there is a need for a novel signal feedback gain circuit so as to overcome the issues of the prior art.

SUMMARY OF THE INVENTION

It is a primary object of the present invention to provide a signal feedback gain circuit capable of flexibly adjusting a gain curve of a transmission signal.

To achieve the object, a signal feedback gain circuit of the present invention is applied to a signal transmission channel so as to compensate for attenuation of a transmission signal in the signal transmission channel, wherein the signal transmission channel is for transmitting the transmission signal to an electronic module. The signal feedback gain circuit includes a signal input terminal, a summing point, a gain module, a signal output terminal and a plurality of feedback paths. The signal input terminal is for inputting the transmission signal. The summing point is connected to the signal input terminal. The gain module is connected to the summing point so as to input the transmission signal and to perform a gain process on the transmission signal. The signal output terminal is connected to the gain module so as to receive the transmission signal and to output it to the electronic module. The plurality of feedback paths are connected in parallel to the output terminal so as to input the transmission signal and are further connected in parallel to the summing point so as to feedback the transmission signal to the summing point. Accordingly, the plurality of feedback paths can adjust a gain curve of a transmission signal.

DETAILED DESCRIPTION OF THE EMBODIMENTS

Preferred specific embodiments are given below for better understanding of the technical contents of the present invention.

Figure 2:
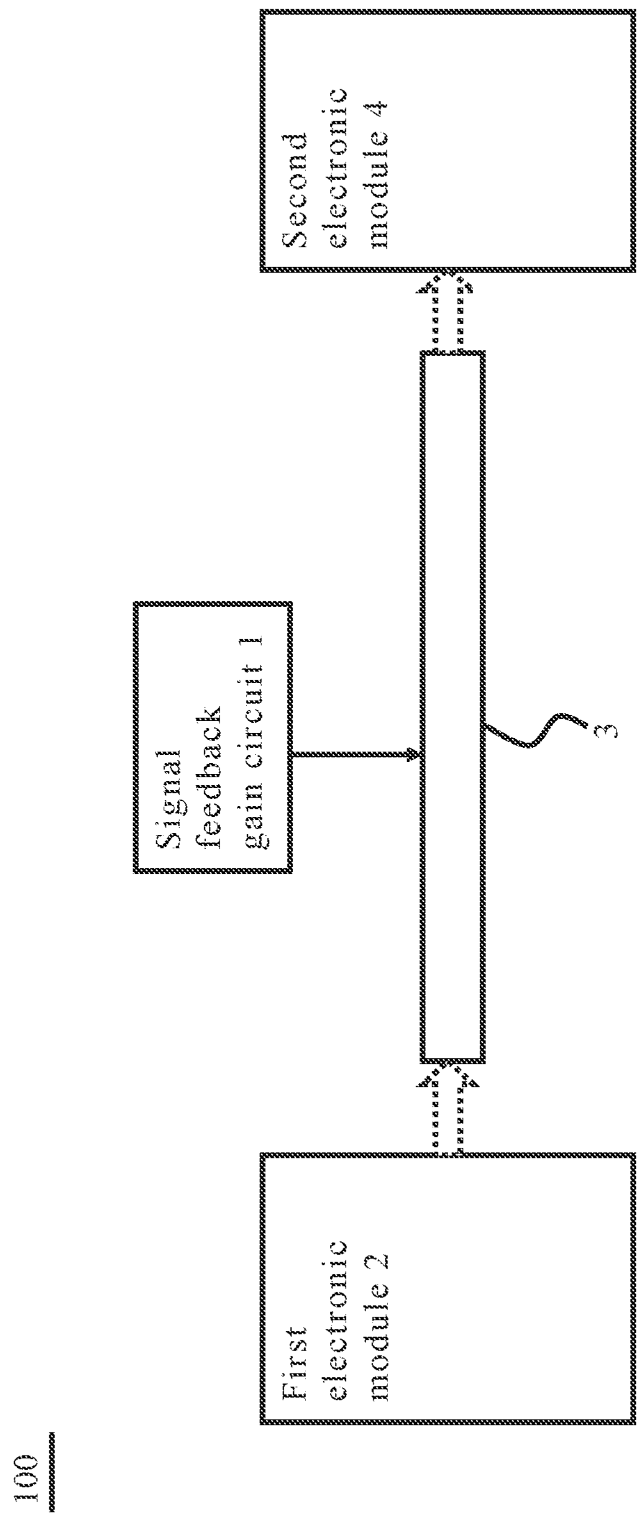
FIG. 2 is a schematic diagram of an application of a signal feedback gain circuit of the present invention.

Please refer to FIG. 2, which shows a schematic diagram of an application of a signal feedback gain circuit of the present invention.

A signal feedback gain circuit 1 is applied in a computer system 100 to compensate a transmission signal in a signal transmission channel 3. The computer system 100 may be a system such as a computer host, a laptop computer, a smartphone or a tablet computer; however, the present invention is not limited to the exemplary apparatuses enumerated above. The computer system 100 may include therein a first electronic module 2, the signal transmission channel 3 and a second electronic module 4, wherein the signal transmission channel 3 is connected between the first electronic module 2 and the second electronic module 4. The first electronic module 2 and the second electronic module 4 may be the same or different modules, and first electronic module 2 and the second electronic module 4 may be any module that can generate, transmit or receive transmission signals, such as a central processing unit (CPU), a graphics processor, a memory or a storage module; however, the present invention is not limited to the exemplary apparatuses enumerated above. A transmission signal generated by the first electronic module 2 is transmitted through the signal transmission channel 3 to the second electronic module 4. The signal transmission channel 3 may be a transmission channel of PCIe Gen5 or PCIe Gen6, or a printed circuit board (PCB) trace; however, the present invention is not limited to the exemplary apparatuses enumerated above. The signal feedback gain circuit 1 is for performing gain compensation on the transmission signal so as to reduce loss of the transmission signal caused by various factors.

Figure 3:
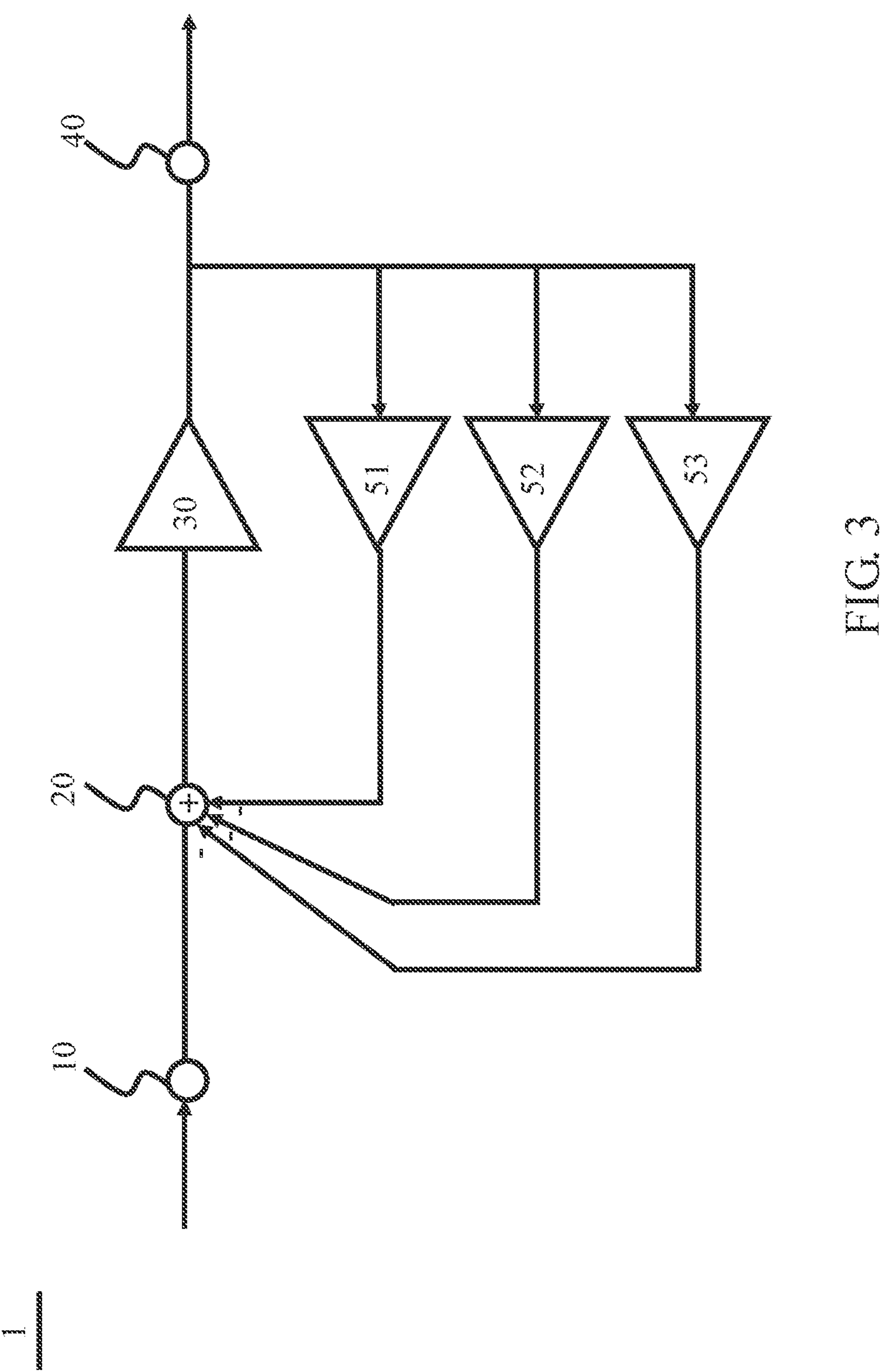
FIG. 3 is a schematic diagram of a structure of a signal feedback gain circuit of the present invention.

Now please refer to FIG. 3, which shows a schematic diagram of a structure of a signal feedback gain circuit of the present invention.

The signal feedback gain circuit 1 includes a signal input terminal 10, a summing point 20, a gain module 30, a signal output terminal 40 and a plurality of feedback paths 51, 52 and 53. The signal input terminal 10 is for inputting the transmission signal. The summing point 20 is connected to the signal input terminal. The gain module 30 is connected to the summing point 20 so as to input the transmission signal and to perform a gain process on the signal transmission signal. The gain module 30 is an amplifier or a signal re-driver. The signal output terminal 40 is connected to the gain module 30 so as to receive the transmission signal and to output it to the electronic module 4. The plurality of feedback paths 51, 52 and 53 are common feedback paths connected in parallel to the signal output terminal 40 for inputting the transmission signal, and the plurality of feedback paths 51, 52 and 53 are further connected in parallel to the summing point 20 so as to feedback the transmission signal to the summing point 20. In one embodiment of the present invention, three feedback paths 51, 52 and 53 are provided as an example, but the present invention is not limited to that exemplary value.

Figure 4:
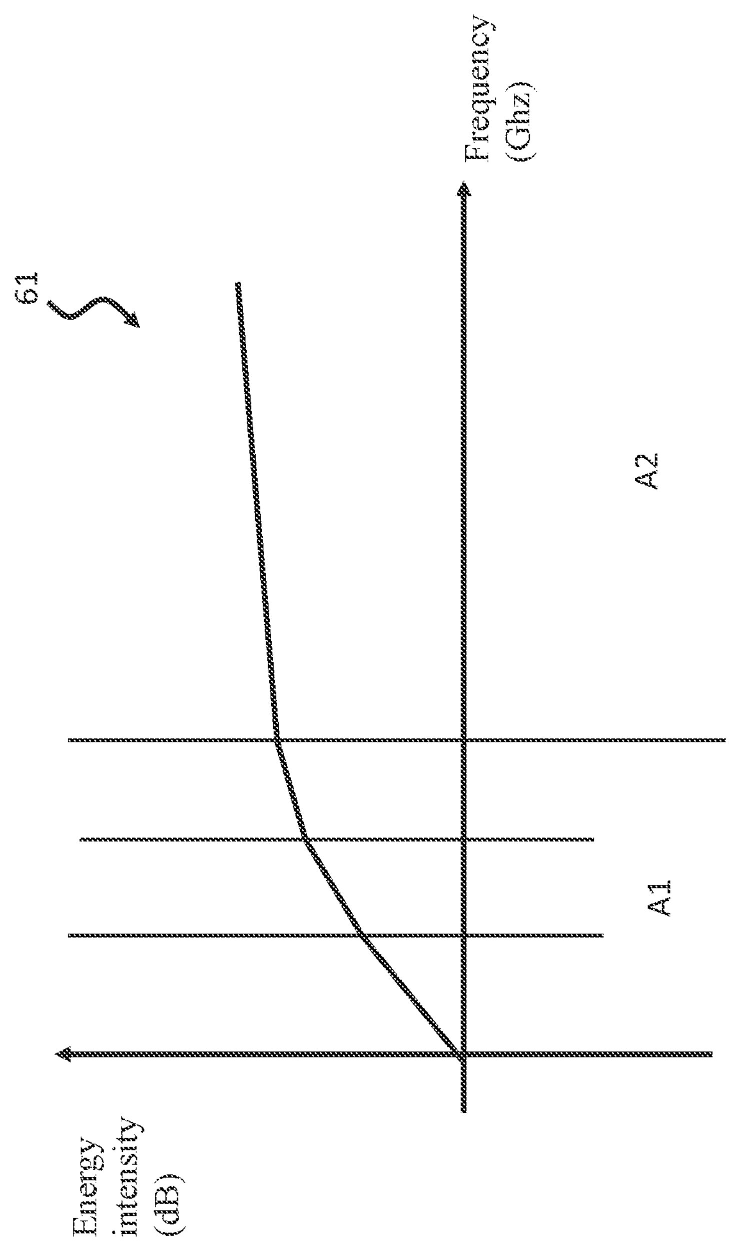
FIG. 4 is a schematic diagram of a signal gain curve of the present invention.

Please refer to FIG. 4, which shows a schematic diagram of a signal gain curve of the present invention.

Figure 1:
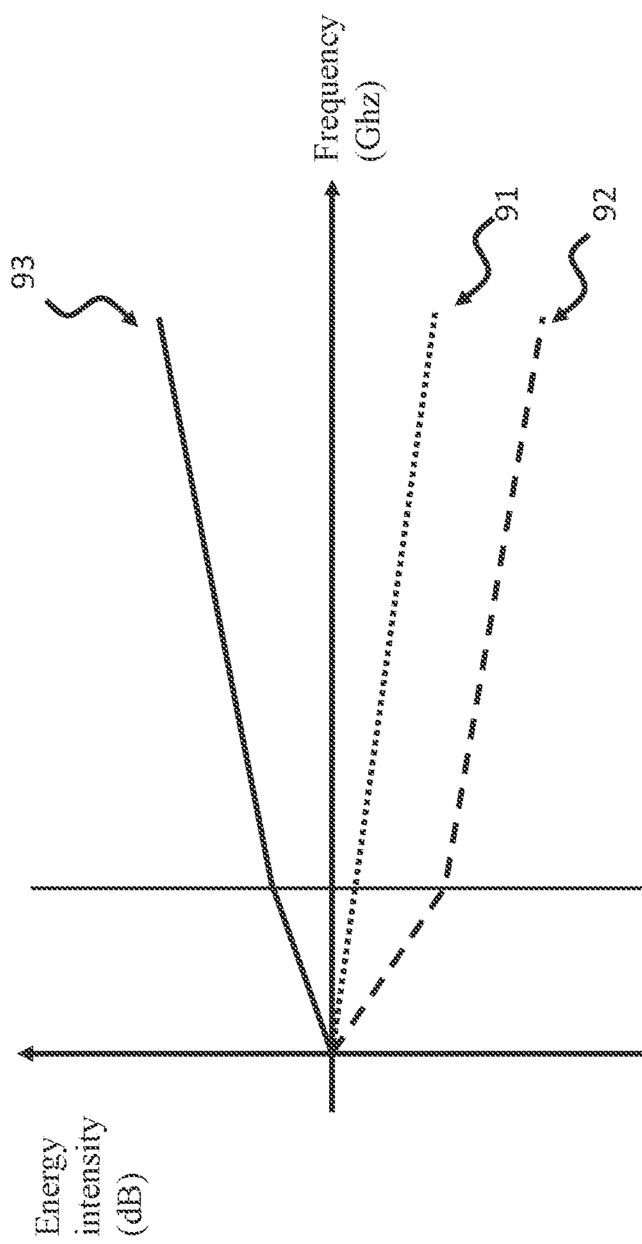
FIG. 1 is a schematic diagram of a signal energy intensity curve of the prior art.

With the signal feedback gain circuit 1 above, a gain curve 61 shown in FIG. 4 can be obtained. The gain curve 61 can be divided into a low-frequency interval A1 and a high-frequency interval A2, and the number of the feedback paths 51, 52 and 53 is for determining the number of break points in the low-frequency interval A1 of the gain curve 61; that is, the low-frequency interval A1 may be further divided into several smaller intervals. The signal feedback gain circuit 1 can adjust a gradient of the low-frequency interval A1 of the gain curve 61 by a gain value of any of the feedback paths 51, 52 and 53, and signal feedback gain circuit 1 can also adjust the position of the break point between the low-frequency interval A1 and the high-frequency interval A2 of the gain curve 61 by the position of the pole of any of the feedback paths 51, 52 and 53. Thus, the transmission signal, having been compensated by the signal feedback gain circuit 1, can have a signal energy curve that better approaches the ideal curve 91 shown in FIG. 1.

Thus, with the number, gain values and positions of the poles of the feedback paths 51, 52 and 53, the gain curve 61 of the transmission signal can be flexibly adjusted to compensate the energy of the transmission signal such that the actual signal energy curve approaches the ideal curve 91.

It can be understood from the description above that the signal feedback gain circuit 1 of the present invention can adapt to different types of signal transmission channels 3 to adjust the gain curve so as to achieve an energy compensation effect which is noticeably better than that of the prior art.

It should be noted that the description above provides merely non-limiting embodiments that are not to be construed as limitations to the present invention. Modifications made without departing from the fundamental structure of the present invention are to be encompassed within the scope in accordance with the appended claims.

What is claimed is:

1. A signal feedback gain circuit, applied to a signal transmission channel to compensate attenuation of a transmission signal in the signal transmission channel, the signal transmission channel being for transmitting the transmission signal to an electronic module, the signal feedback gain circuit comprising:

a signal input terminal, for inputting the transmission signal;

a summing point, connected to the signal input terminal;

a gain module, connected to the summing point so as to input the transmission signal and to perform a gain process on the transmission signal;

a signal output terminal, connected to the gain module so as to receive the transmission signal and output it to the electronic module; and a plurality of feedback paths, connected in parallel to the output terminal so as to input the transmission signal, the plurality of feedback paths further being connected in parallel to the summing point so as to feedback the transmission signal to the summing point such that the plurality of feedback paths is able to adjust a gain curve of the transmission signal; wherein the gain curve has a low-frequency interval and a high-frequency interval and the number of the plurality of feedback paths is for determining the number of break points in the low-frequency interval of the gain curve.

2. The signal feedback gain circuit as claimed in claim 1, wherein a gain value of any of the feedback paths is for adjusting a gradient of the low-frequency interval of the gain curve.

3. The signal feedback gain circuit as claimed in claim 2, wherein a position of a pole of any of the feedback paths is for adjusting a position of a break point between the low-frequency interval and the high-frequency interval of the gain curve.

4. The signal feedback gain circuit as claimed in claim 1, wherein a position of a pole of any of the feedback paths is for adjusting a position of a break point between the low-frequency interval and the high-frequency interval of the gain curve.

5. The signal feedback gain circuit as claimed in claim 1, wherein the gain module is an amplifier.

6. The signal feedback gain circuit as claimed in claim 1, wherein the gain module is a signal re-driver.

* * * * *